United States Patent Office 2,943,552
Patented July 5, 1960

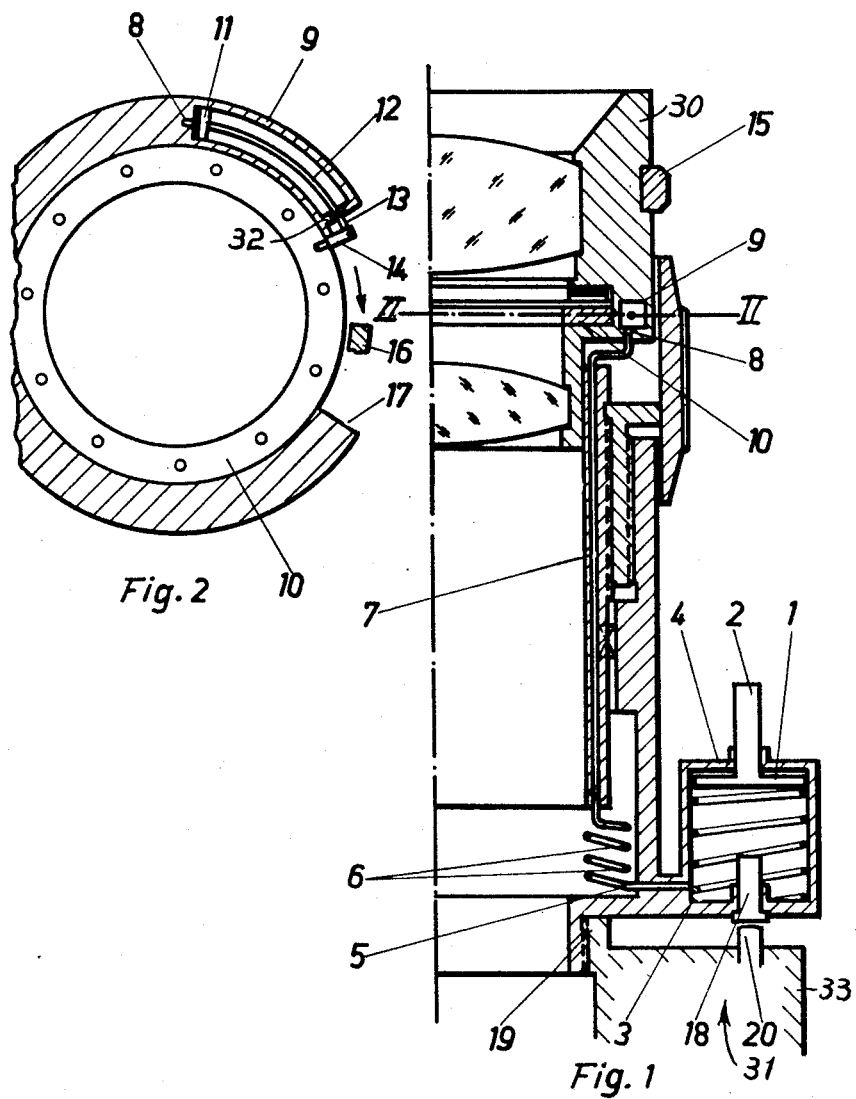

2,943,552
PHOTOGRAPHIC CAMERA

Albart Schiks, Munich-Obermenzing, Germany, assignor to Optische Werke C. A. Steinheil Sohn G.m.b.H., Munich, Germany, a firm Filed Feb. 20, 1956, Ser. No. 566,656

Claims priority, application Germany Mar. 24, 1955

5 Claims. (Cl. 95—64)

The invention relates to a photographic camera and is particularly concerned with a photographic camera having a built-in or exchangeable objective with a long focus and provided with a free-selection diaphragm, which may be diminished automatically to a pre-selected amount prior to the release of the camera shutter.

In devices of this type the device for the transmission of movement for diminishing the diaphragm, which must be caused by the release, is comparatively complicated and expensive to manufacture, while the number of precision parts required for this purpose is comparatively great.

An object of the present invention is to eliminate the above drawbacks of prior art constructions and to provide a device for operating the diaphragm which consists of a comparatively few parts and is inexpensive to manufacture.

Other objects of the present invention will become apparent in the course of the following specification.

In accomplishing the objects of the present invention it was found that a substantial simplification, and thus a diminution of manufacturing costs of a device of the described type, can be attained when the diminution of the diaphragm is carried out by pressure transmitted pneumatically or hydraulically and provided by an auxiliary device which is connected with the release mechanism of the shutter of the camera.

According to a further embodiment of the invention the release mechanism of the camera device is moved by a spring into an initial position after the photograph has been taken, whereby under-pressure is provided which opens again the diaphragm.

According to one embodiment a cylinder with a piston is mounted in front of the release pin of the camera, whereby the piston acting against spring pressure may be moved in the cylinder by means of a pin or the like, and then can be pressed further toward a second pin or the like, which is located opposite the pin releasing the shutter, until the shutter is released. Pneumatic or hydraulic pressure is transmitted by a tube or hose located preferably within the objective and parallel to its axis to a piston guided within an annular cylinder located close to the annular iris diaphragm, the piston being provided with a push rod or the like, which is connected or is brought into contact, preferably by means of a joint, with the ring of the iris diaphragm. The conduit transmitting the pressure which, as already stated, may consist of a tube or hose, can be made at least in part, as well as the auxiliary device and the parts actuating the diaphragm, out of a bendable or elastic material, such as a plastic material. The pipe or hose transmitting the pressure can be substantially straight and mounted in a simple manner; however, in order to increase its elasticity when setting the distance, that part which is close to the camera, may be guided in the form of a helix.

The invention will appear more clearly from the following detailed description when taken in connection with the accompanying drawing showing, by way of example, a preferred embodiment of the inventive idea.

In the drawing:

Figure 1 is a longitudinal section through a part of the camera located close to the objective.

Figure 2 is a section along the line II—II of Figure 1.

The camera shown diagrammatically in the drawing includes an objective 30 and a camera casing 31, which is connected therewith. The objective 30 carries an auxiliary device comprising a cylinder 4 containing a piston 1 which is integral with a pin 2 extending out of the cylinder 4. A spring 3 located within the cylinder 4 presses against the piston 1. The interior of the cylinder 4 is connected with a pressure conduit 5, which has a helical portion 6 and a straight portion 7 carried by the objective 30. The objective 30 contains an annular chamber 9 which is preferably rectangular in cross-section, and which is located close to the annular iris diaphragm 10 of the usual type and shown diagrammatically in the drawing.

As shown in Figure 2, the chamber 9 contains a piston 11 connected with a rod 12. The end 13 of the rod 12 is connected by a joint 32 with a member 14, which is rigidly connected with the iris ring 10. A stop 16 for the member 14 may be set by means of the pre-selection ring 15.

The cylinder 4 also carries a pin 18 which is located at the bottom thereof, and which may engage a pin 20 constituting a part of the camera release 33. This device is of standard construction and is not shown in greater detail in the drawing.

The operation of the device is as follows:

When the user presses upon the pin 2 which is firmly connected with the piston 1, the spring 3 is compressed and the piston 1 moves within the cylinder creating a pressure in the medium such as liquid or gas which fills the cylinder 4. This medium flows through the conduits 5, 6, and 7 into the annular cylinder 9. Within the cylinder 9 the medium presses against the piston 11 and moves this piston along with the piston rod 12 clockwise (looking in the direction of Figure 2). Since the rod 12 is connected with the iris ring 10, the ring 10 will also turn clockwise until the member 14 strikes a stop 16 which had been previously set by means of the selection ring 15. When the diaphragm is completely closed the member 14 will strike the surface 17. Due to this arrangement the diaphragm is turned to the desired extent.

In the course of the movement of the piston 1 within the cylinder 4, it will strike the pin 18 and if the operator continues to press against the pin 2, the piston 1 will move the pin 18 against the pin 20 thereby producing the release.

When the user releases pressure upon the pin 2 the spring 3 will move the piston 1 back to its initial position thereby producing suction or under-pressure within the cylinder 4. This suction will move the piston 11 back to its initial position.

If desired, a spring (not shown) may be also used to move the piston 11 back to its inital position.

It is apparent that the pressure conduit consists of a major portion 7 which extends along a straight line within the objective, while the portion 6 located close to the camera body 19 may extend helically so as to improve the yieldability when setting the distance. The conduit portions 6 and 7, as well as the members, 1, 2, 4, 9, 11 and 12 may be made of a plastic material.

It is apparent that the paths of movement of the pistons 1 and 11 and pin 18 are inversely proportional to their surfaces. Thus, a small movement of the pin 2 connected with the piston 1 is necessary to move the piston 11 and the iris ring 10 connected therewith to the selected position in engagement with the stop 16. Further movement of the pin 2 will actuate the pin 18 and the release pin 20. It is apparent that the sequence in time of the setting of the diaphragm and the release can be conveniently determined by suitably selecting the resilient pressure to be overcome.

These considerations are equally applicable to hydraulic as well as pneumatic pressure-transmitting means. However, in the case of a pneumatic transmission, after the member 14 strikes the stop 16, the fluid within the cylinder 4 will be compressed by further movement of the piston 1 until the pin 18 is actuated.

It is apparent that the example shown above has been given solely by way of illustration and not by way of limitation, and that it is subject to many variations and modifications within the scope of the present invention.

All such variations and modifications are to be included within the scope of the present invention.

What is claimed is:

1. In a photographic camera having a diaphragm, a ring for setting the diaphragm to a predetermined position, a cylinder adjacent to said ring, and a shutter release having a releasing pin; a cylinder located opposite said releasing pin, a piston within the second-mentioned cylinder, resilient means located within the second-mentioned cylinder and engaging said piston, resilient means located within the second-mentioned cylinder and engaging said piston, an actuating member carried by the second-mentioned cylinder and adapted to be engaged by said piston and to engage said releasing pin, whereby the shutter release is actuated, a conduit for pressure fluid connected with said two cylinders, a piston within the first-mentioned cylinder, and an actuating member connected with the second-mentioned piston and actuating said ring.

2. A camera in accordance with claim 1, comprising a joint connecting the second-mentioned actuating member with said ring.

3. A camera in accordance with claim 1, wherein at least a part of said conduit consists of an elastic material.

4. A camera having an objective in accordance with claim 1, wherein said conduit comprises a portion located within the objective and extending parallel to the axis thereof.

5. A camera in accordance with claim 1, wherein said conduit includes a helical portion located adjacent to the second-mentioned cylinder.

References Cited in the file of this patent

UNITED STATES PATENTS

| | | |
|---|---|---|
| 1,602,483 | Freeman | Oct. 12, 1926 |
| 2,262,509 | McNabb | Nov. 11, 1941 |
| 2,397,742 | Kals | Apr. 2, 1946 |
| 2,716,930 | Marson | Sept. 6, 1955 |

FOREIGN PATENTS

| | | |
|---|---|---|
| 1,080,386 | France | May 26, 1954 |